(12) United States Patent
Davis et al.

(10) Patent No.: US 6,414,753 B1
(45) Date of Patent: Jul. 2, 2002

(54) LOW STRAY LIGHT CZERNY-TURNER MONOCHROMATOR

(76) Inventors: Arthur Davis, 28 Vick Park B, Apt. 3, Rochester, NY (US) 14607-2122; Kim McNallie, 86 Beckwith Rd., Rochester, NY (US) 14623-5135

( * ) Notice: Subject to any disclaimer, the term of this patent is extended or adjusted under 35 U.S.C. 154(b) by 154 days.

(21) Appl. No.: 09/596,243

(22) Filed: Jun. 16, 2000

(51) Int. Cl.[7] .................................................. G01J 3/18
(52) U.S. Cl. ........................ 356/305; 356/328; 356/334
(58) Field of Search ................................. 356/305, 326, 356/328, 331, 332, 334

(56) References Cited

U.S. PATENT DOCUMENTS

| | | |
|---|---|---|
| 2,750,836 A | 6/1956 | Fastie |
| 3,011,391 A | 12/1961 | Fastie |
| 5,192,981 A | 3/1993 | Slutter et al. |

Primary Examiner—F. L. Evans
(74) Attorney, Agent, or Firm—Neal L. Slifkin; Harris Beach LLP

(57) ABSTRACT

A monochromator is provided which reduces the amount of stray light striking the detector of the monochromator. A light source is provided which directs light to a source mirror. The source mirror reflects light from the light source through a filter and an entrance slit, and to a first monochromator mirror. The first monochromator mirror collimates the light and reflects it to a diffractive surface. The diffractive surface separates the light into its individual wavelength components. The separated light is directed from the diffractive surface to a second monochromator mirror. The second monochromator mirror directs the light to an exit slit. The present invention reduces stray light to the diffractive surface by tilting the second monochromator mirror off axis at an angle to prevent the reflected light from striking the diffractive surface or directing light out of the plane of diffraction. The exit slit must be at a sufficient elevation above the diffractive surface in the housing to receive the reflected light. The light passes through the exit slit to a sample mirror. From this sample mirror, light is directed through a beam splitter. A portion of this light passes through the beam splitter, through a sample to be analyzed and to a detector. The other portion of the light reflects off of the beam splitter and passes to a second detector. The light striking the first detector (sample detector) is compared to the light striking the second detector (reference detector) so that the properties of the sample may be analyzed.

27 Claims, 7 Drawing Sheets

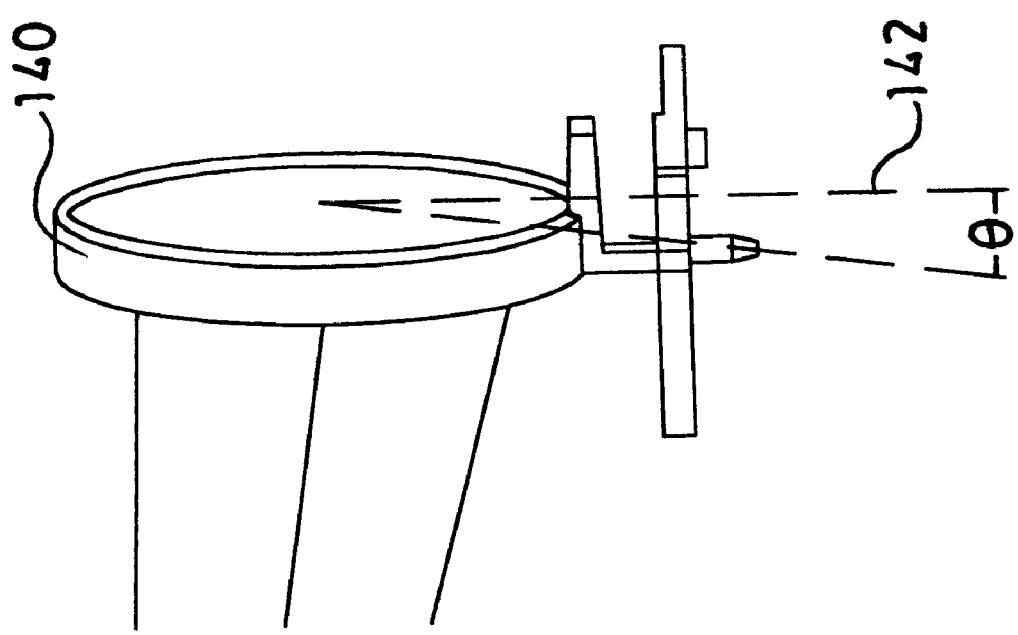

LOW STRAY LIGHT CZERNY-TURNER MONOCHROMATOR

BACKGROUND OF THE INVENTION

1. Field of the Invention.

The present invention relates to a monochromator. In particular, the present invention relates to a monochromator with an off axis mirror for reducing the amount of stray light which strikes the diffractive surface of the monochromator.

2. Background of the Invention.

Monochromators are well known in the prior art. Their function is to isolate a selected wavelength of light from a source of illumination. The selected wavelength is used for analytical purposes such as analyzing the properties of a sample through which the light is passed.

Monochromators generally comprise a light source, an entrance slit for receiving light to be analyzed, means for separating the light into its individual wavelengths and an exit slit for selecting a desired component. Generally, monochromators of one type also include a mirror for receiving light from the entrance slit and collimating the light, a diffractive surface for dispersing the light into its individual components, a focusing mirror for receiving those components and refocusing them for presentation at an exit slit. After passing through the exit slit, the light is passed through a sample to be analyzed and directed to a detector to analyze the light. One type of monochromator that has been known in the art for many years is a Czerny-Turner Monochromator. One such Czerny-Tuner Monochromator is described in U.S. Pat. No. 5,192,981, the disclosure of which is incorporated by reference. Additional monochromators are described in U.S. Pat. Nos. 2,750,836 and 3,011,391, both issued to Fastie, the disclosures of which are incorporated by reference.

When the monochromator is use in spectroscopy, the amount of light absorption at a particular wavelength of light allows a chemist to determine how much of a particular chemical, enzyme, element, or compound is in the sample being measured. The sample is illuminated with monochromatic light, and light is either absorbed or transmitted according to the presence of a given molecular compound with the proper energy levels proportional to the wavelength of illumination. The resulting absorbance (optical density) or transmittance of the sample is measured. This seemingly simple procedure can present many challenges for the electro-optical designer, who must consider the light source, light transmission medium, spectral separation method, and finally detection requirements.

The light source used is usually a broad-spectrum source, such as the traditional two-lamp tungsten-halogen and deuterium system, or more recently, xenon flash lamp or white light emitting diodes. In one method of spectroscopy, the broadband source illuminates the sample directly before it is separated into its spectral elements. This separation is achieved using a planar or concave reflective diffractive surface, acousto-optical tunable filter, transmission diffraction grating, or even a transmission film grating. In this spectrograph configuration, the resultant absorption as a function of wavelength is often measured using a linear CCD or photo-diode array as the detection method. In a monochromator configuration, the light is first separated from the broadband source into its spectral elements, and then the monochromatic light is focused onto the sample of interest prior to detection at a single small detector.

In a monochromator, it is desirable to have light of only one wavelength pass through the exit slit and to the detector. In the past, after light has been reflected from the diffractive surface, a portion of that light was reflected back to the diffracting grating. This portion of the light is referred to as stray light. The stray light is then reflected back to the second mirror and out the exit slit. This light, because it is of a different wavelength from the analytical wavelength, is undesirable. One solution is to attempt to filter out the stray components by using some form of band rejection filter. However because of the geometry of the monochromator, stray light is caused by light at higher wavelengths than the analytical wavelength. The application of a low pass filter is then indicated. However, only high pass filters are widely available at economic prices. It is additionally possible to eliminate this source of stray light by masking off the center region of the grating. This has the undesirable side effect of drastically reducing the total energy at the analytical wavelength.

The present invention provides a novel solution to the stray light problem, without the drawbacks of the solutions used in the past.

SUMMARY OF THE INVENTION

The present invention greatly reduces the amount of stray light striking the diffractive surface of the monochromator. The invention includes a housing adapted to contain the components of the monochromator. A light source is. provided, for example, a xenon flash lamp, which is designed to direct light to a source mirror. Other light sources could be used including tungsten-halogen lamps, tungsten-halogen and deuterium lamps, or white light emitting diodes. The source mirror reflects light from the light source through a first slit, the entrance slit. Preferably, the light source directs the light at a downward angle toward the mirror. The light source is preferably in the same vertical plane as the axis through the entrance slit to minimize the effects of aberrations.

After passing through a filter and an entrance slit, light is directed to a first monochromator mirror. Alternatively, the filter may be placed in other locations in the optical path. The first monochromator mirror collimates the light and reflects it to a diffraction grating or defractive surface having a reflective diffractive surface. The diffractive surface rotates about a vertical axis, the purpose of which will be described hereinafter. The diffractive surface separates the light into its individual wavelength components. The separated light is directed from the diffractive surface to a second monochromator mirror. The second monochromator mirror directs the light to an exit slit.

In monochromators of the past, some light from the second monochromator mirror could be directed back to the diffractive surface. This stray light is then directed back to the second monochromator mirror and can be presented to the exit slit. It is desirable to have light of only a single analytical wavelength pass through the exit slit. The present invention solves the problem of stray light being directed back to the diffractive surface by tilting the second monochromator mirror off axis. Specifically, the second monochromator mirror is tilted at an angle θ from the vertical. The light which is reflected from the second monochromator mirror will not strike the diffractive surface but will pass harmlessly above or below the diffractive surface, or if it strikes the diffractive surface it will not be in the plane of diffraction. Light striking the diffractive surface out of the plane of diffraction will be reflected above or below the second monochromator mirror. The angle at which the second monochromator mirror is tilted may be any suitable angle sufficient to prevent the light from striking the diffractive surface, or to prevent the light from striking the diffractive surface in the plane of diffraction. Preferably, the angle θ is about four degrees when the distance between the mirrors and slits (the focal length) is about 140 mm, although other dimensions are possible. It is important that the angle θ be from the vertical, i.e. that the light be directed at an angle from the horizontal so that horizontal aberrations are minimized. If the mirror is tilted with respect to a horizontal axis sufficiently to prevent light from reflecting back to the grating, aberrations in the horizontal would limit the bandpass of the monochromator. Also, because the spectrum is spread across the horizontal plane, a much smaller angle is required with respect to the vertical than if the mirror is tilted with respect to a horizontal axis. If the mirror is tilted with respect to a horizontal axis, the footprint of the monochromator would have to be much larger.

The exit slit, of course, must be at a sufficient elevation above the diffractive surface in the housing to receive the reflected light. The light passes through the exit slit to a sample mirror. From this sample mirror, light is directed through a beam splitter, as is known. A portion of this light passes through the beam splitter, through a sample to be analyzed and to a detector. The sample may be held in a cuvette as is known and may be one of several samples held to be analyzed in series to increase the throughput of the analyzer. The other portion of the light reflects off of the beam splitter and passes to a second detector. The light striking the first detector (sample detector) is compared to the light striking the second detector (reference detector) so that the properties of the sample may be analyzed. Alternatively, the reference detector could be eliminated and only the sample detector could be used.

The design presented here overcomes the problem of prior art monochromators in a simple design by tilting the second monochromator mirror upwards. The image of the slit is moved upwards which is accommodated for by moving the exit slit to meet the image. Correction of the tilted optical axis is accomplished by tilting the sample mirror downward. By tilting the second monochromator mirror sufficiently, stray light passes over the top of the grating missing it completely or is directed out of the plane of diffraction. Additionally, energy throughput remains high, and spectral imaging quality is not sacrificed because the aberrations caused by tilting the mirror up are in the opposite plane. Tilting the mirrors after the diffractive surface minimizes the stray light problem. By tilting mirrors only after the grating, collimated "in-plane" light is still incident on the grating allowing for good spectral imaging. Also, by tilting only the second monochromator mirror out of the plane of diffraction, there are no additional aberrational contributions to the horizontal (spectral) plane and stray light is still reduced. The monochromator of the present invention also has a small foot-print.

The invention will now be described in detail with reference to the accompanying drawings.

DESCRIPTION OF THE DRAWINGS

FIG. 7 is a simplified side view of a portion of the present invention of FIG. 6.

DESCRIPTION OF THE PREFERRED EMBODIMENTS

Figure 1:
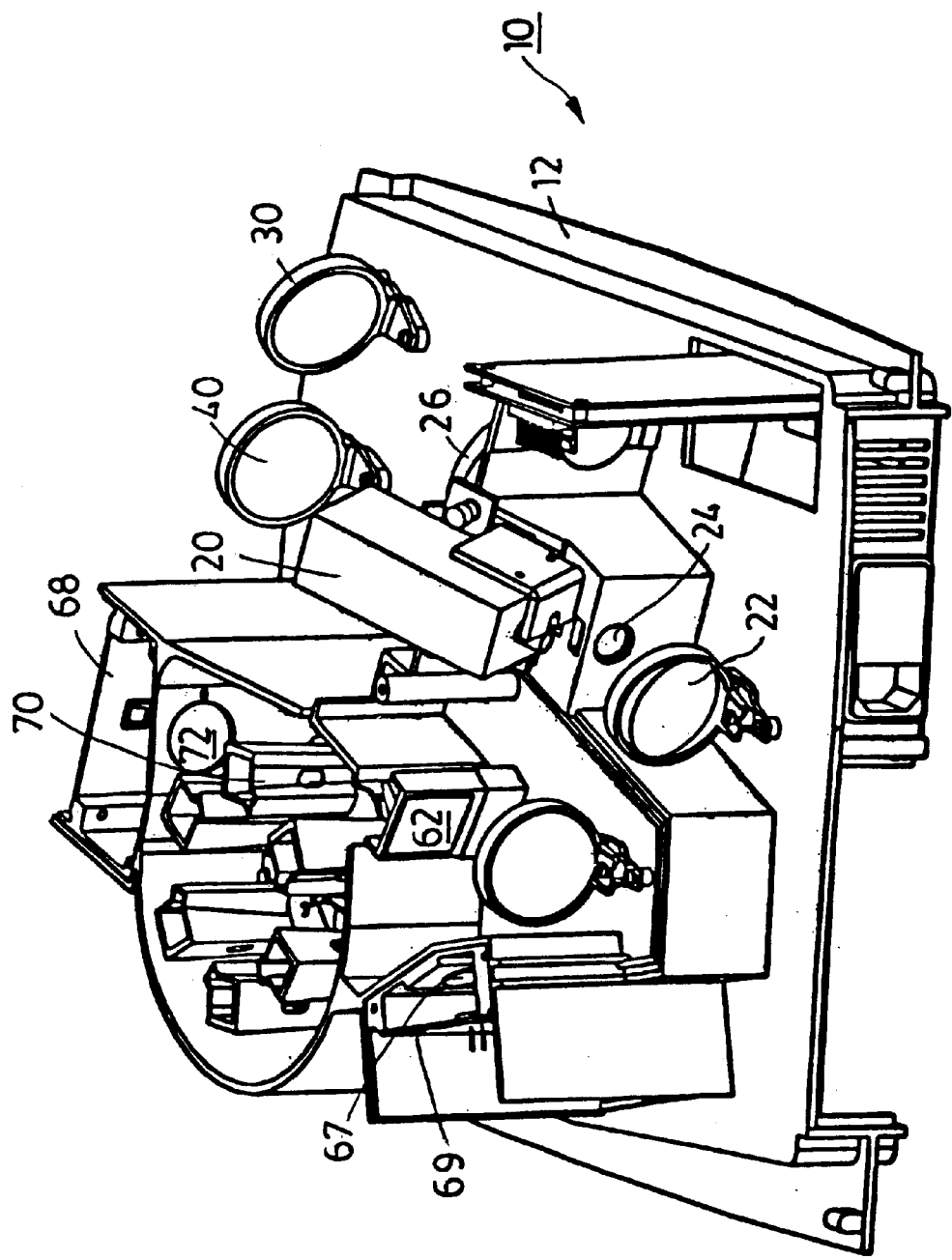
FIG. 1 is a perspective view of the interior of the monochromator of the present invention with the top of the housing removed.
Figure 2:
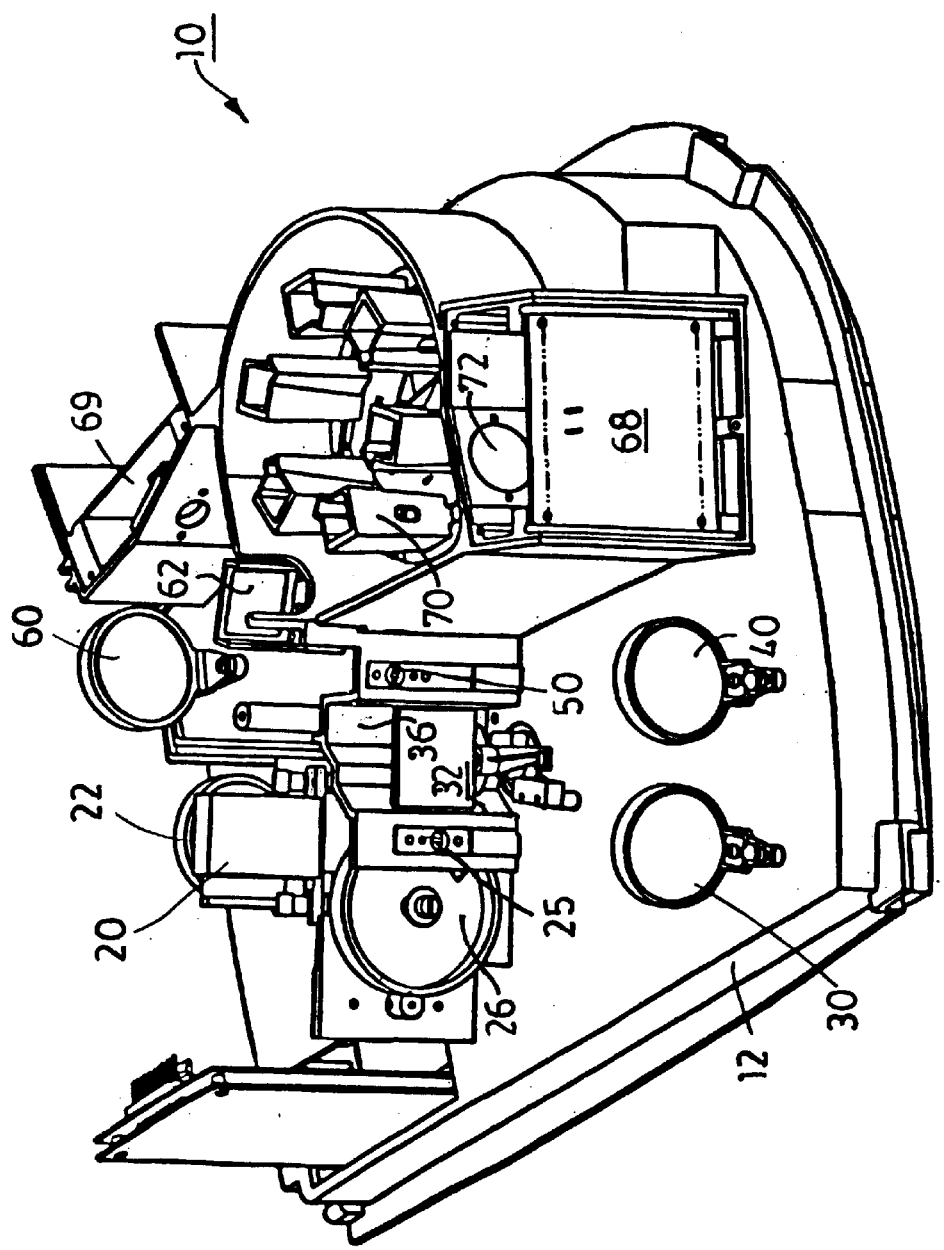
FIG. 2 is a front perspective view of the monochromator of FIG. 1.
Figure 3:
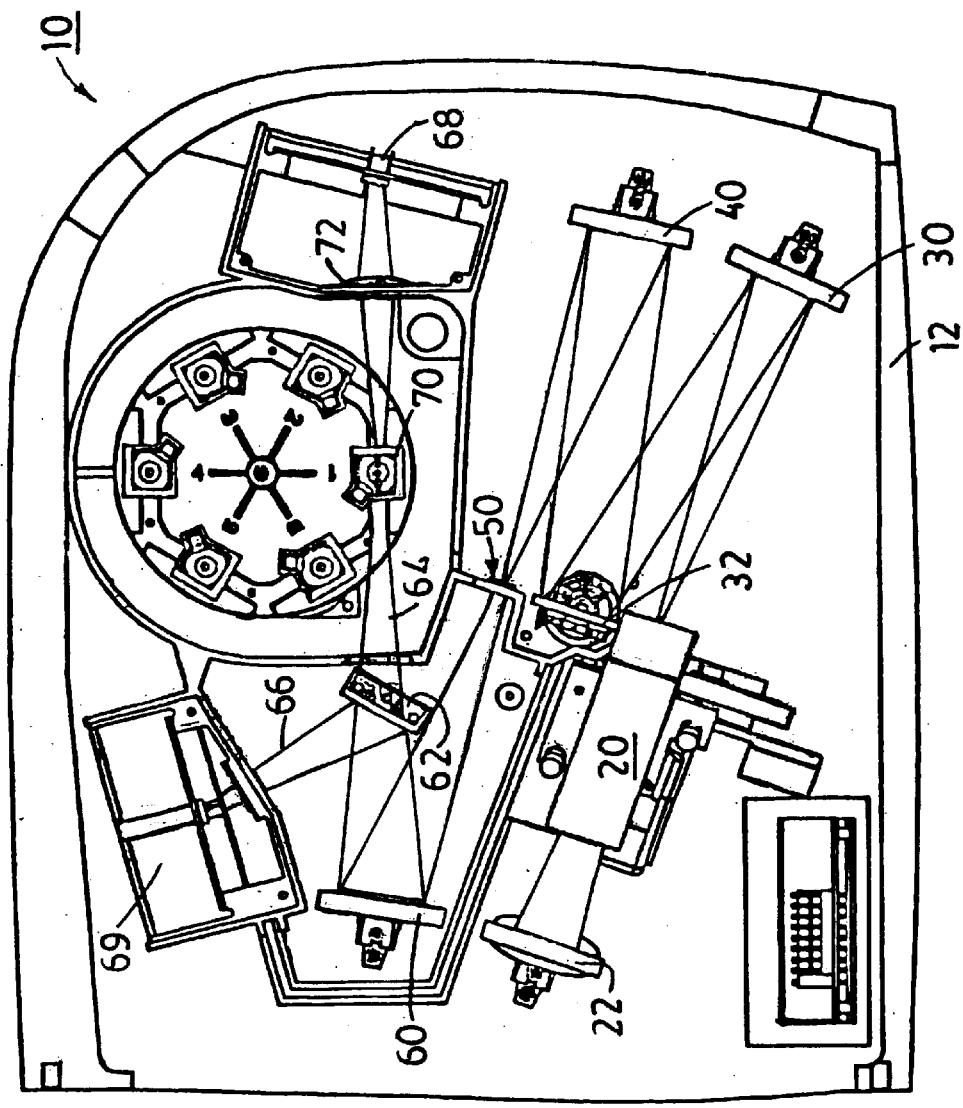
FIG. 3 is a top view of the monochromator of FIG. 1 showing the light path.

Referring to FIGS. 1–4, the monochromator 10 includes a housing 12. For illustration purposes, only the base of the housing is shown in the drawing, it being understood that the housing encloses the entire monochromator 10 to prevent external light from entering. A light source 20 is provided within the housing 12. Preferably, the light. source 20 is a xenon flash light source, although other light sources are known to those of skill in the art. The light source 20 directs light to a source mirror 22. Light is reflected from the source mirror 22 and is directed through an aperture stop 24. The light source 20 is preferably in the same vertical plane as the mirror 22 and an axis through the center of the entrance slit 25 to limit aberrations and to optimize the footprint of the monochromator 10. The mirror 22 is a spherical mirror and focuses light on the entrance slit 25.

After passing through the filter 26, the light passes through the entrance slit 25. The filter 26 is a high pass filter and is selected as a function of analytical wavelength. The filter 26 blocks lower wavelength light, whose second or third order diffractions in the monochromator can adversely affect light of the chosen analytical wavelength unless filtered. The light then strikes the first monochromator mirror 30. The first monochromator mirror 30 is placed so that the entrance slit 25 is at the focal point of the first monochromator mirror 30. The light is collimated by the mirror 30 and is reflected to a diffractive surface 32. The diffractive surface 32 is preferably a Sheridon grating, although other types of gratings will work. A Sheridon grating has lower stray light characteristics than ruled gratings. The diffractive surface 32 splits the light into individual wavelength components and directs these components to a second monochromator mirror 40. The second monochromator mirror 40 reflects the diffracted light to the exit slit 50. The exit slit 50 is located at the focal point of the second monochromator mirror 40. Because it is desirable to have only a single preselected wavelength of light pass through the exit slit 50, the diffractive surface 32 is rotatable about a vertical axis. By varying the position of the diffractive surface 32, the wavelength of light passing through the exit slit 50 is selected.

Figure 4:
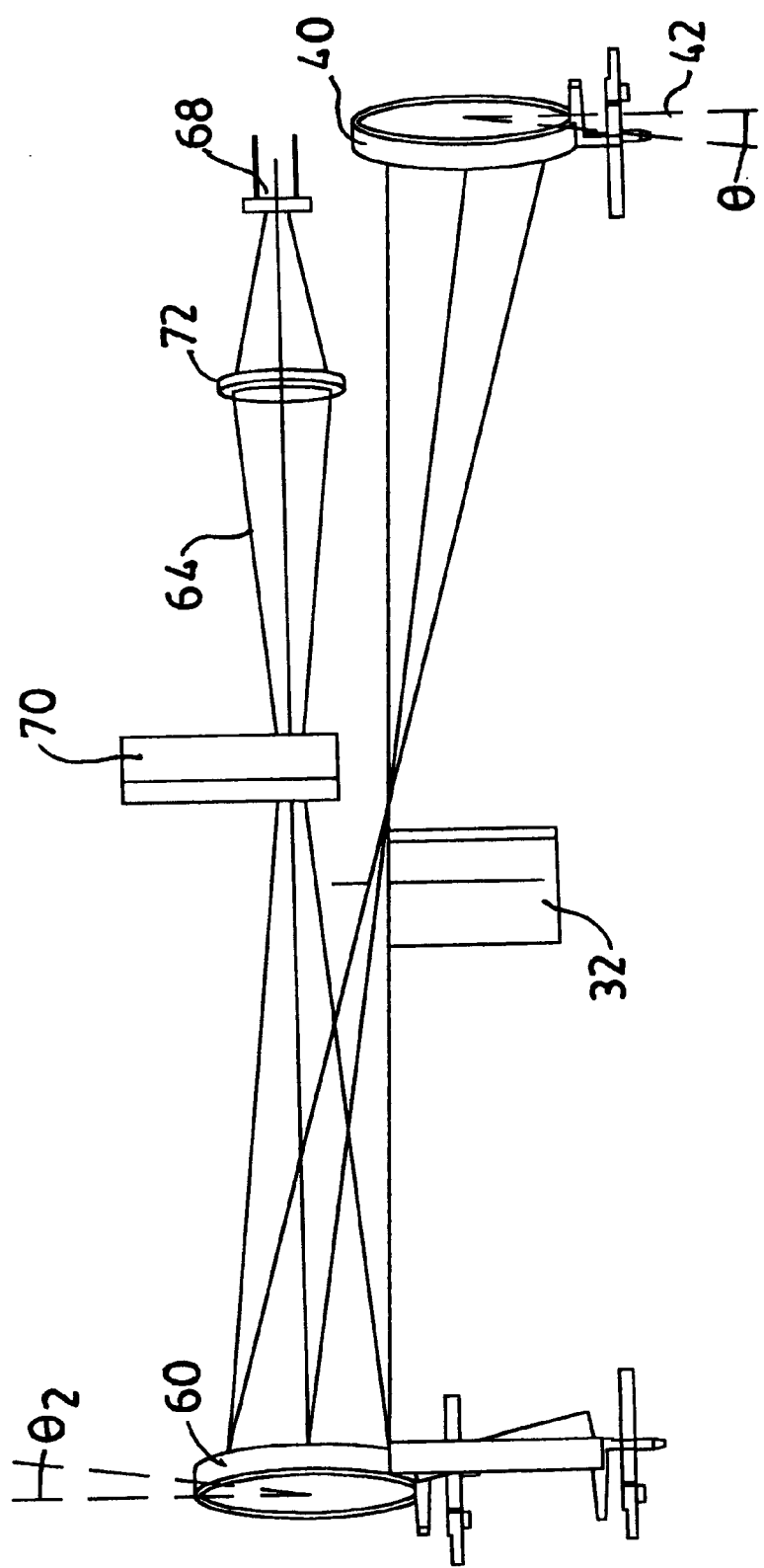
FIG. 4 is a simplified side view of the present invention showing the light path.
Figure 5:
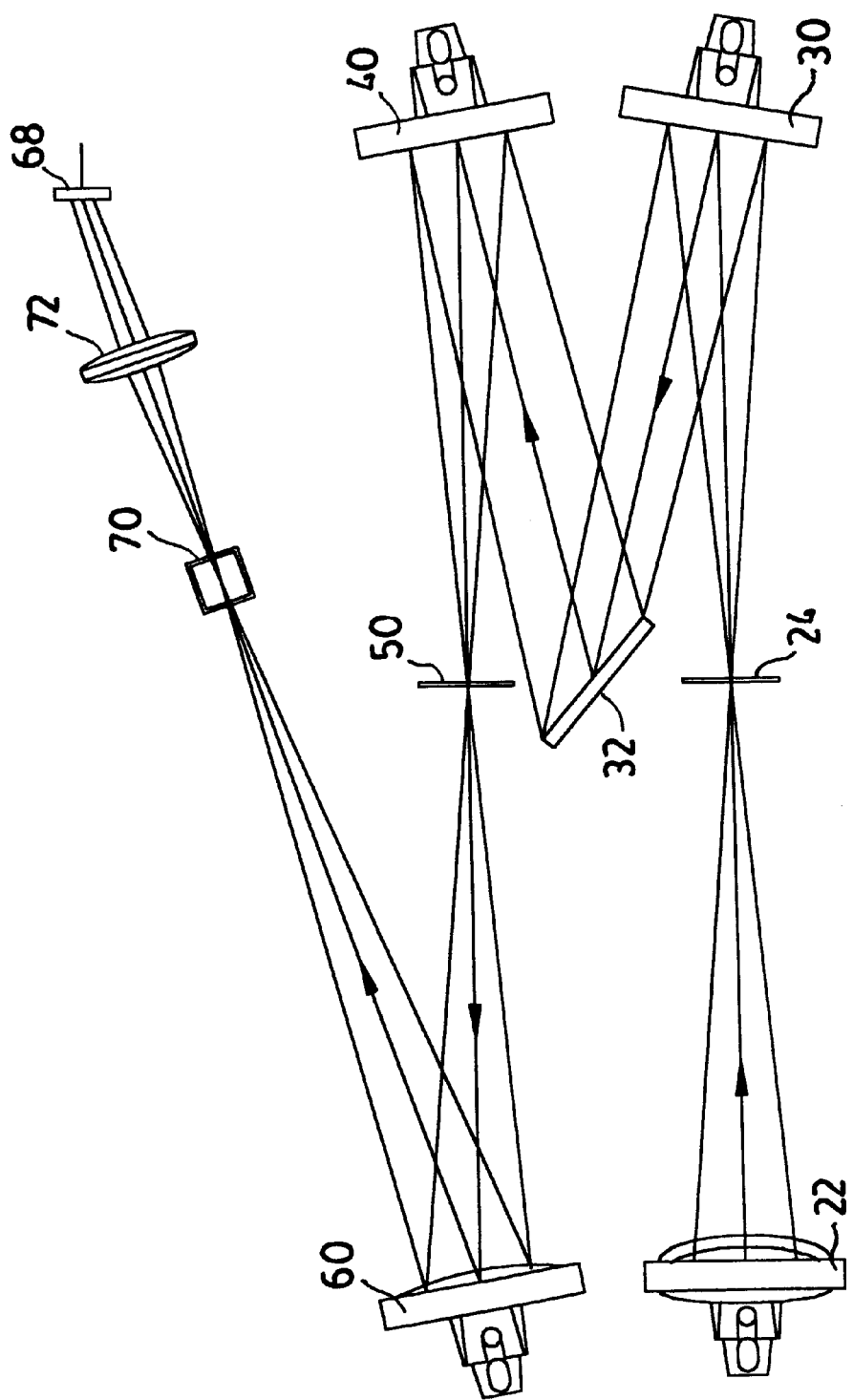
FIG. 5 is a simplified top view of the present invention showing the light path.

In the past, light striking the second monochromator mirror might be reflected back to the diffractive surface and back again to the second monochromator mirror. The present invention prevents this undesirable condition by tilting the second monochromator mirror 40 at an angle θ from the vertical axis 42 (FIG. 4). Preferably, the angle θ is approximately 4 degrees. Light reflected from the second monochromator mirror 40 is directed above the diffractive surface 32 and absorbed by the wall 36 or is directed harmlessly out of the plane of incidence. The exit slit 50, of course, is placed at an elevation such that the light reflected off the second monochromator mirror 40 passes through the exit slit. After passing through the exit slit 50, light strikes a sample mirror 60 which is also tilted at an angle from the vertical axis 52 (FIG. 4). The sample mirror 60 is tilted at an angle $\theta_2$ from the vertical which is approximately equal and opposite to the angle θ. Light reflected from the mirror 60 is directed to a beam splitter 62. Preferably, the mirror 60 is also at an angle in the horizontal plane of approximately 10 degrees from the plane of the exit slit 50 although other angles are possible. A portion of the light passes through the beam splitter 62 and another portion is reflected from the beam splitter 62 as is known. The portion of the light 64, passing through the beam splitter 62 is directed to a cuvette 70, which holds a sample (not shown). The mirror 60 is located such that it images the exit slit at the center of the sample. After passing through the cuvette and sample, the light is directed through a lens 72 to a detector 68. The other portion 66 of the light is reflected from the beam splitter 62 is directed through a second lens 67 to a second detector 69. The light striking the detectors 68 and 69 is compared to analyze the properties of the sample, as is known.

Figure 6:
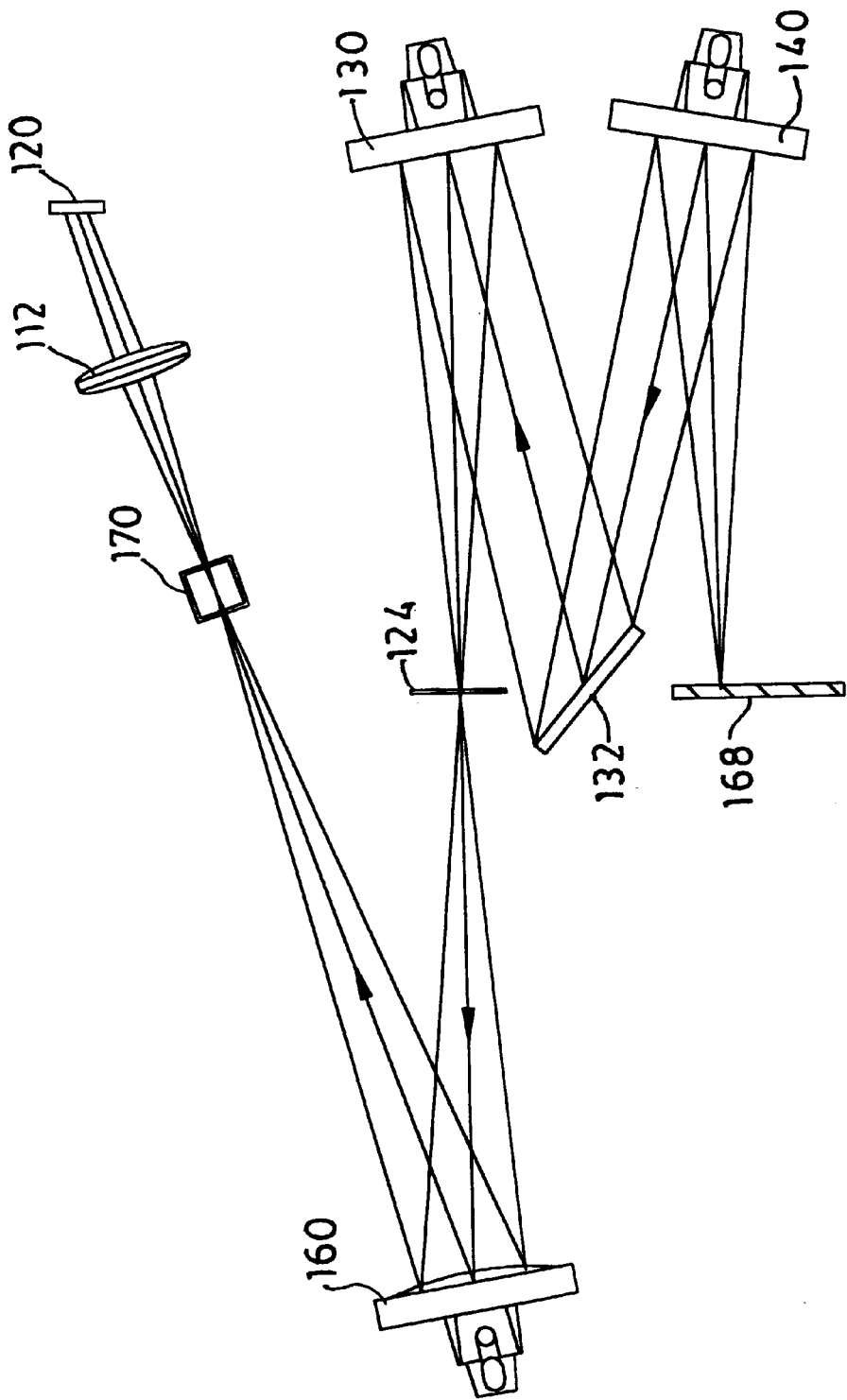
FIG. 6 is a simplified top view of an alternative embodiment of the present invention showing the light path.

Referring to FIG. 6, an alternative embodiment of the present invention is shown. A light source 120 is provided. The light source 120 directs light through a lens 112. Light is then directed through a cuvette 170 holding a sample (not shown) and to a sample mirror 160. From the sample mirror 160 the light is directed through the entrance slit 124 and then is directed to a first spectrograph mirror 130. The first spectrograph mirror 130 is placed so that the entrance slit 124 is at the focal point of the first spectrograph mirror 130. The light is collimated by the mirror 130 and is reflected to a diffractive surface 132. The diffractive surface 132 splits the light into individual wavelength components and directs these components to a second spectrograph mirror 140. The second spectrograph mirror 140 reflects the diffracted light to a photodiode array 168.

The second spectrograph mirror 140 is tilted at an angle θ from the vertical axis 142 (FIG. 7). Preferably, the angle θ is approximately 4 degrees. Light reflected from the second spectrograph mirror 140 is directed above the diffractive surface 132. The photodiode array 168, of course, is placed at an elevation such that the light reflected off the second spectrograph mirror 140 strikes the photodiode array 168. Light striking the photodiode array 168 is analyzed to determine the properties of the sample.

While this invention has been described in detail with reference to preferred embodiment, it should be appreciated that the present invention is not limited to that precise embodiment. Rather, in view of the present disclosure which describes the best mode for practicing the invention, many modifications and variations would present themselves to those with skill in the art without departing from the scope and spirit of this invention, as defined by the following claims.

What is claimed is:

1. A monochromator for analyzing light passing through a sample, comprising:
   a housing;
   a first monochromator mirror within the housing having a reflective surface at a first angle with respect to the vertical;
   an entrance slit;
   a light source mounted within the housing adapted to direct light through the entrance slit to the first monochromator mirror;
   a diffractive surface mounted within the housing adapted to receive light from the first monochromator mirror, the diffractive surface having a top edge, a bottom edge and a reflective diffractive surface therebetween;
   a second monochromator mirror mounted within the housing adapted to receive light from the diffractive surface in a plane of diffraction, said second monochromator mirror having a reflective surface at a second angle with respect to the vertical, different from said first angle, such that light reflected from the reflective surface of the second monochromator mirror is directed at an angle such that the light does not strike the reflective diffractive surface of the diffractive surface in the plane of diffraction;
   an exit slit; and
   a detector for analyzing light passing through the exit slit and the sample.

2. The monochromator of claim 1 wherein the light reflected from the second monochromator mirror is directed out of the plane of diffraction.

3. The monochromator of claim 1 wherein the light reflected from the second monochromator mirror is directed above the top edge of the diffractive surface.

4. The monochromator of claim 1 wherein the light reflected from the second monochromator mirror is directed below the bottom edge of the diffractive surface.

5. The monochromator of claim 3 wherein the first angle is zero degrees from the vertical and the second angle is between 3 and 5 degrees from the vertical.

6. The monochromator of claim 3 wherein the entrance slit is at a first vertical position and the exit slit is at a second vertical position above the first vertical position.

7. The monochromator of claim 1 wherein the entrance slit is at a first vertical position and the exit slit is at a second vertical position below the first vertical position.

8. The monochromator of claim 3 further including a third mirror between the exit slit and the first detector and a beam splitter between the third mirror and the first detector.

9. The monochromator of claim 8 wherein the third mirror is at a third angle to the vertical which is equal and opposite to the second angle.

10. The monochromator of claim 9 wherein the second angle is approximately 4 degrees.

11. The monochromator of claim 1 wherein the diffractive surface is mounted for rotation about a vertical axis.

12. The monochromator of claim 1 wherein the light source comprises a xenon flash lamp.

13. The monochromator of claim 1 wherein the light source comprises tungsten-halogen and deuterium lamps.

14. The monochromator of claim 1 wherein the light source comprises tungsten-halogen lamps.

15. The monochromator of claim 1 wherein the light source comprises white light emitting diodes.

16. A spectrograph for analyzing light passing through a sample, comprising:
   a housing;
   a first mirror within the housing having a reflective surface at a first angle with respect to the vertical;
   an entrance slit;
   a light source mounted within the housing adapted to direct light through the sample and the entrance slit to the first mirror;
   a diffractive surface mounted within the housing adapted to receive light from the first mirror, the diffractive surface having a top edge, a bottom edge and a reflective diffractive surface therebetween;
   a second mirror mounted within the housing adapted to receive light from the diffractive surface in a plane of diffraction, said second mirror having a reflective surface at a second angle with respect to the vertical, different from said first angle, such that light reflected from the reflective surface of the second mirror is directed at an angle such that the light does not strike the reflective diffractive surface of the diffractive surface in the plane of diffraction; and a photodiode array for analyzing the light reflected from the second mirror.

17. The spectrograph of claim 16 wherein the light reflected from the second mirror is directed out of the plane of diffraction.

18. The spectrograph of claim 16 wherein the light reflected from the second mirror is directed above the top edge of the diffractive surface.

19. The spectrograph of claim 16 wherein the light reflected from the second mirror is directed below the bottom edge of the diffractive surface.

20. The spectrograph of claim 17 wherein the first angle is zero degrees from the vertical and the second angle is between 3 and 5 degrees from the vertical.

21. The spectrograph of claim 17 wherein the entrance slit is at a first vertical position and the photodiode array is at a second vertical position above the first vertical position.

22. The spectrograph of claim 16 wherein the entrance slit is at a first vertical position and the photodiode array is at a second vertical position below the first vertical position.

23. The spectrograph of claim 20 wherein the second angle is approximately. 4 degrees.

24. The spectrograph of claim 16 wherein the light source comprises a xenon flash lamp.

25. The spectrograph of claim 16 wherein the light source comprises tungsten-halogen and deuterium lamps.

26. The spectrograph of claim 16 wherein the light source comprises tungsten-halogen lamps.

27. The spectrograph of claim 16 wherein the light source comprises white light emitting diodes.

* * * * *